United States Patent [19]
Lichty et al.
[11] Patent Number: 4,749,072
[45] Date of Patent: Jun. 7, 1988

[54] CLUTCH MECHANISM

[75] Inventors: Ronald D. Lichty, San Francisco; Thomas W. Crosley, Saratoga; Victor H. Yee, Oakland, all of Calif.

[73] Assignee: Schlage Lock Company, San Francisco, Calif.

[21] Appl. No.: 47,509

[22] Filed: Apr. 29, 1987

Related U.S. Application Data

[63] Continuation of Ser. No. 849,610, Apr. 8, 1986, abandoned.

[51] Int. Cl.4 .............................................. F16D 13/22
[52] U.S. Cl. ................................ 192/40; 192/0.02 R; 70/DIG. 51
[58] Field of Search ................. 192/30 W, 40, 0.02 R, 192/54, 67 R, 84 P, 93 R, 95, 114 R; 710/DIG. 51, 219

[56] References Cited

U.S. PATENT DOCUMENTS

| | | | |
|---|---|---|---|
| 4,079,605 | 3/1978 | Bartels | 70/DIG. 51 X |
| 4,110,768 | 8/1978 | Numata | 192/0.02 R X |
| 4,331,226 | 5/1982 | Heidemeyer et al. | 192/0.096 X |
| 4,526,256 | 7/1985 | Urdal | 192/40 |
| 4,592,249 | 6/1986 | Lehmann et al. | 192/30 W X |
| 4,605,107 | 8/1986 | Hallidy et al. | 192/0.02 R |

*Primary Examiner*—David A. Scherbel
*Assistant Examiner*—Creighton Smith
*Attorney, Agent, or Firm*—Walter C. Vliet

[57] ABSTRACT

Disclosed is a clutch mechanism suitable for use in an electronic lock. The clutch mechanism requires minimum electronic current draw for operation by utilizing mechanical power applied to operate the lock to engage the clutch mechanism. A camming device in combination with a timed function motion sensor and latching solenoid released interference shutter accomplishes the object of the invention.

8 Claims, 2 Drawing Sheets

CLUTCH MECHANISM

BACKGROUND OF THE INVENTION

The advent of microprocessor logic and its ability to operate with very low power requirements has spawned a large number of applications to remote operations wherein it is impractical to supply other than battery power. In such operations, it is essential to conserve power draw and thereby extend the life of the decision capability of the microprocessor.

One such application has been found in the reprogrammable combination electronic lock. The use of a battery powered microprocessor eliminates the need for hard wiring doors and further allows such locks to be utilized in remote locations where power is not readily available. A problem in the past has been the amount of power required to engage the locking mechanism once the microprocessor has decided that it is appropriate to do so.

U.S. Pat. No. 4,526,256 discloses a clutch mechanism of which this invention may be considered an improvement thereof.

SUMMARY OF THE INVENTION

The present invention comprises a clutch mechanism which requires extremely low current draw by utilizing, in part, mechanically applied power to assist in engagement of the clutch mechanism and a novel combination of timed function motion sensor and latching solenoid set and released interference shutter. The object of the invention is to provide a clutch mechanism which requires minimal current drain for operation once a decisional command to operate the clutch is received.

A further object of the invention is to provide a simple, reliable and economical clutch mechanism. It is a further object of the invention to provide a clutch mechanism which may be utilized in combination with a microprocessor logic circuit in many applications.

Yet a further object is to provide a clutch mechanism for use with a combination electric lock which may be battery powered.

These and other objects are obtained in a clutch mechanism, for an electronic lock or the like, comprising: a first rotary clutch element, mounted for free rotation about, and relative to, a spindle, having a first jaw element; a second clutch element, mounted for translation along, and rotation in common with, the spindle, having a second jaw element engageable with the first jaw element for effecting rotation of one of the clutch elements in response to the rotation of the other of the clutch elements; means interposed between the clutch elements normally restraining the clutch elements in spaced-apart disposition; means for resiliently urging one of the clutch elements to move towards the other of the clutch elements, in reponse to rotation of one of the clutch elements to cause said jaw elements to engage; means for selectively preventing movement of the one clutch element towards the other clutch element, whereby the first and second jaw elements are prevented from effecting engagement and rotation of the one clutch element in response to rotation of the other clutch element; the improvement comprising: a latching means in the means for selectively preventing movement of the one clutch element; timing means for release of the latching means; and motion sensing means for alternatively releasing the latching means.

DESCRIPTION OF THE PREFERRED EMBODIMENT

Figure 1:
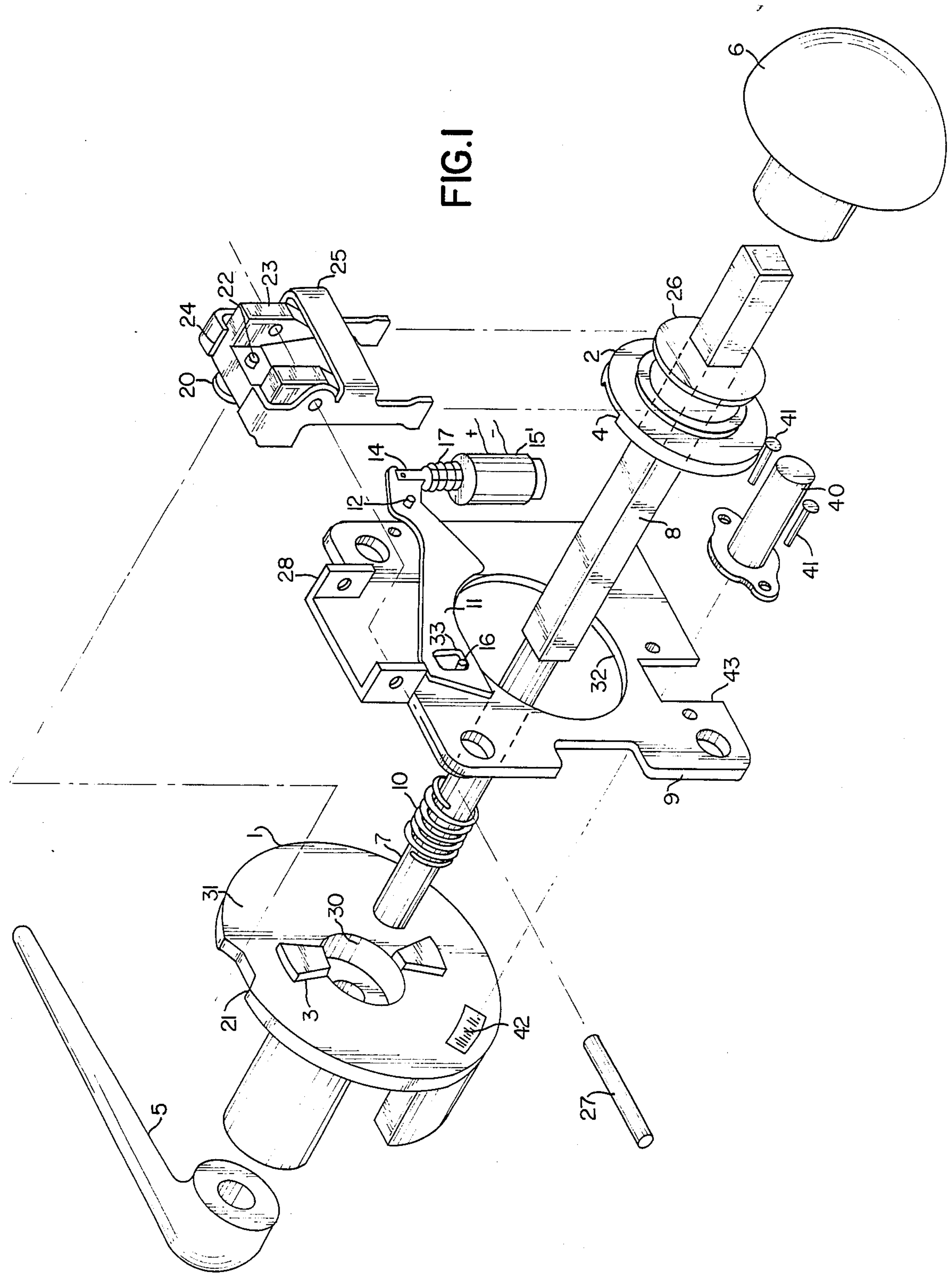
FIG. 1 is an exploded view of the clutch mechanism according to the present invention, as applied to a lock.

FIGS. 1 through 4 show a clutch mechanism according to the present invention embodied in a door lock mechanism. The door lock mechanism is intended for use with a microprocessor or other logic sequence, or decisional mechanism which would activate a latching solenoid such as solenoid 15 as depicted in FIG. 1.

It is intended that the power requirements necessary to operate solenoid 15 be minimal. It is also intended that the clutch mechanism, which engages the outer handle with the spindle, derive its energy of operation primarily from rotation of the outer handle. Further, it is intended that engagement of the clutch mechanism will enable rotation of the lock actuating spindle by the outer handle, The lock may be of any convenient or conventional configuration which utilizes a manually energized spindle to operate the latching mechanism.

Referring now to FIG. 1, the clutch mechanism according to this invention is comprised of an outer clutch plate 1, which is mounted for rotation about a cylindrical portion of an outside spindle 7. In mounting, the outer clutch plate 1 will not be free to translate axially along the outer spindle 7.

An outer lever handle 5 is shown attached to the outer clutch plate 1 for rotation therewith by means not shown. It should be understood that outer handle 5 may be manufactured as part of the outer clutch plate 1 or attached thereto by any convenient means.

The outer clutch plate is provided with a set of opposed outer jaws 3 and an operating cam 21 disposed on the outside periphery of the outer clutch plate 1.

A coacting inner clutch plate 2 is mounted on an inside spindle 8 of square cross section. The inner clutch plate 2 rotates with the spindle 8 and is free to translate axially along the spindle from an inner position to an outer position wherein a coacting female jaw member 4 engages the outer jaw member 3. It should be appreciated by one skilled in the art that rotation of the outer handle and outer clutch plate will not rotate the outer spindle, and the inner spindle will not rotate until the inner clutch plate is moved towards the outside and the coacting jaws of the clutch engage. Once engaged, the inner spindle 8 may be rotated by the outer handle 5.

A coil spring 10 is disposed about the outer spindle 7 and centered partially in a recess 30 formed in the face of the outer clutch plate 1. The purpose of coil spring 10 is to yieldingly urge the inner clutch plate 2 out of engagement with the outer clutch plate 1. A mounting plate 9 forms a positioning base for the lock mechanism.

FIG. 1 is an exploded view of the mechanism according to the present invention, and it should be appreciated that on assembly, the face 31 of the outer clutch plate 1 would be in close proximity or contact with the outer face of the mounting plate 9, with the outer clutch jaws concentric with and extending partially into the hole 32 of the mounting plate. The peripheral diameter of the inner clutch plate 2 is slightly smaller than the diameter of the hole 32 so as to allow it to enter the hole to permit engagement of the jaws.

A shutter 11 is shown mounted on mounting plate 9 by means of a shutter pin 12. The mounting allows the shutter 11 to rotate about pin 12. A stop pin 16 fixed in and projecting outwardly from the mounting plate 9, intrudes into a rectangular orifice 33 formed in the shutter 11 to limit rotation of the shutter 11. As shown in FIG. 1, the shutter is in its release or uppermost position which allows the inner clutch plate to contact the outer clutch plate. It should further be appreciated by one skilled in the art that the shutter may be rotated counterclockwise as shown in FIG. 1, in which position it will partially block hole 32 and interfere with the inner clutch plate passing into hole 32.

The position of the shutter 11 is controlled by solenoid 15. The position shown in FIG. 1 is the activated or release position. A solenoid spring 17 urges the shutter 11 counterclockwise to the interference or lock position when the solenoid 15 is not activated. The solenoid plunger is connected to the shutter 11 by means of a solenoid pin 14.

Figure 3:
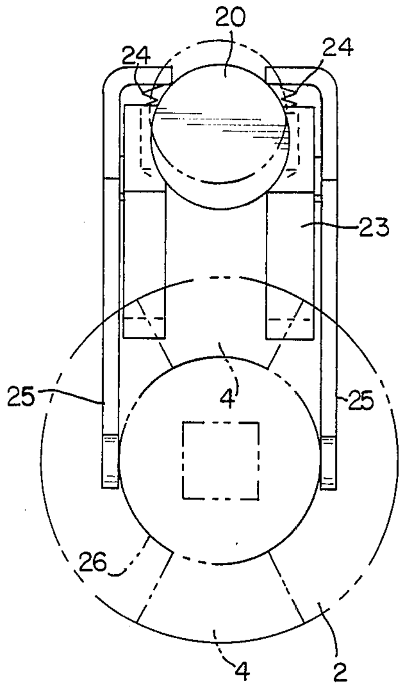
FIG. 3 is an elevational view taken from the left hand side of FIG. 2 in which, however, the inner clutch plate is shown only in phantom.
Figure 2:
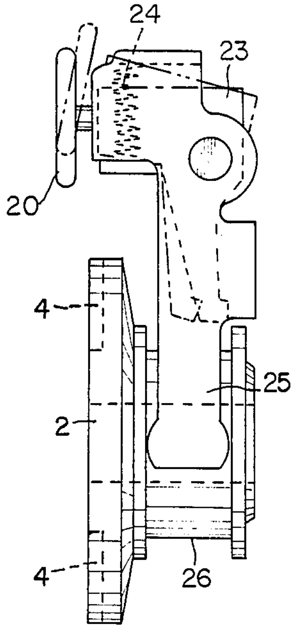
FIG. 2 is a side elevational view in full line illustration of the inner clutch plate, cam follower, follower block, bias springs, and bias arms, the latter shown in engagement with the inner clutch plate, and in dashed outline the cam follower and follower block are shown in a cammed or displaced disposition.

The mechanism which urges the inner clutch plate towards the outer clutch plate is comprised of basically five parts—a cam follower 20, a follower block 23, biasing springs 24, bias arms 25, and spool 26. The aforesaid parts, in their cooperative assembled relationships, are shown in FIGS. 2 and 3.

Spool 26 is attached to inner clutch plate 2 and is free to translate axially along spindle 8. Cam follower 20 is provided with a cam shaft 22 which extends into a bearing hole through cam follower 20. The cam follower 20 may be retained by any suitable means, such as a snap ring, on the cam shaft 22.

It should be understood that the cam shaft 22 is free to rotate in its bearing for the preferred embodiment; however, it is not necessary to have the cam follower rotate except as a means of reducing friction to provide ease of operation.

Cam follower 20 is disposed in cam 21 and provides an index means for handle 5 as well as a device to rotate follower block 23 when cam follower 20 is forced out of cam 21 and rides on the peripheral diameter of outer clutch plate 1. Follower block 23 is provided with a pair of bias springs 24. Only the right hand spring is visible in FIG. 1. A corresponding spring is disposed on the left hand side of the follower block 23.

Bias arms 25 are mounted for rotation about the follower block 23 on a common mounting pin 27. With the bias springs 24 interposed between the following block 23 and the bias arms 25, it should be obvious to one skilled in the art that movement of the cam follower and hence the follower block will result in an urging force developed by bias springs 24 to rotate the bias arms in a clockwise direction as viewed from the left of FIG. 1.

The follower block 23 and bias arms 25 are mounted to the mounting plate 9 in a U-shaped saddle 28 by means of the mounting pin 27 as shown. It should be appreciated now that rotation of the handle 5 results in the clockwise rotation of the bias arms which, in turn, coact in the spool 26 to urge the inner clutch plate towards the outer clutch plate.

It should also be appreciated that when the shutter 11 is in its interfering position, relative movement between the follower block 23 and the bias arms 25 is absorbed by the bias springs 24. This permits rotation of the outside handle 5 without rotation of the spindle 8 and operation of the lock.

When solenoid 15 is activated, by some activating means, shutter 11 will be rotated to a position where its length obstructs the inner clutch plate and the bias arms will urge the inner clutch plate into engagement with the outer clutch plate when the handle is rotated. As a consequence, the inner and outer jaw members 4 and 3 will come into mutual engagement. Accordingly, further rotation of the handle 5 will cause rotation of the spindle 8. Where the spindle 8 serves as an operating element in a lock, its rotation can be used to effect operation of the lock or its mechanism.

An inner handle 6 directly engages spindle 8 and may be utilized to rotate the spindle directly at any time without engagement of the clutch plates.

To this point, except for the use of a latching solenoid 15, the function of the clutch mechanism is as described in U.S. Pat. No. 4,526,256 assigned to Schlage Lock Company. The present invention dramatically reduces the power demand by reducing the time required to energize the solenoid. In addition to reduced power demand, lock security is improved by providing a motion sensing means in combination with the latching solenoid and a timing means. The combination can be utilized to sense lock function and warn of tampering.

Referring now to FIG. 1, an electronic motion sensing device such as optical scanner 40 is shown conveniently mounted on mounting plate 9 by means of rivets 41. A target 42 or identity code is shown attached to the outer clutch plate 1. On assembly and operation the optical scanner "reads" or senses the passing of the target 42 in a well known manner through a square slot 43 cut in the mounting plate 1 for that purpose.

Figure 4:
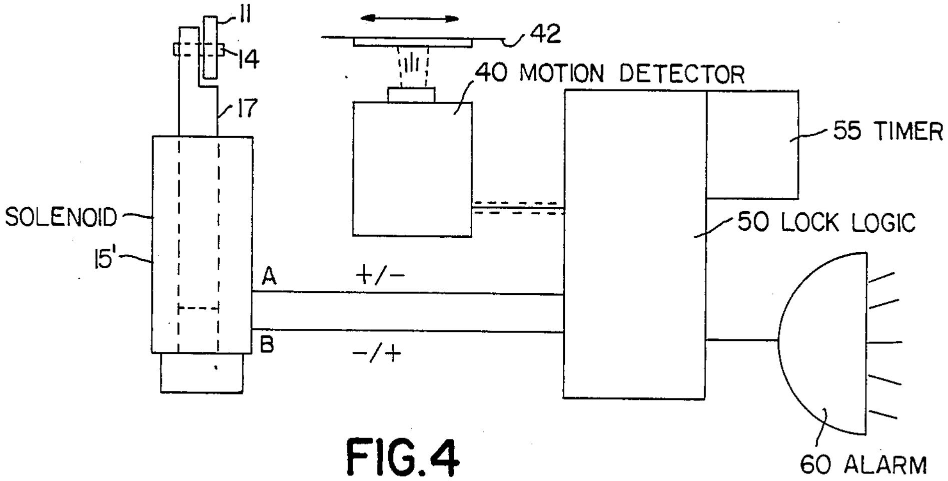
FIG. 4 shows an electronic schematic showing the interrelationship between the timed latch function and the motion sensing function of the present invention.

FIG. 4 is a schematic of the interrelated function of the elements of the present invention. In the prior art, the clutch mechanism was activated in response to a command by the lock logic 50 to open. Solenoid 15 was energized for a convenient period of time, for example 8 seconds, as determined by timer 55. If the operator was not quick enough, he or she would be timed out and would again need to "re-key" the lock for a second function cycle. During the 8 second cycle, the solenoid was fully energized and drawing on the battery.

In the present invention, the DC solenoid 15' is pulsed or energized for a short time only sufficient to retract the plunger and magnetically latch it in the open position. To accomplish this, positive voltage is applied to, for example, terminal A of the solenoid 15'. At this point, timer 55 and motion sensor or detector 40 is activated and one of two options takes place. If the lock handle is not rotated to rotate the outer clutch plate 1, the timer will reset the lock after a relatively longer period of time, say 15 seconds, by application of positive voltage to terminal B for a period of time sufficient to unlatch the solenoid. The motion detector may also be deenergized. In the second alternative, the lock handle will be rotated to open the lock and the motion detector 40 will sense sufficient rotation to open the lock and thereafter the lock is reset again by a short application of positive voltage to terminal B.

It will now be appreciated by one skilled in the art that the amount of time required to have the solenoid 17' energized has been reduced from say 8 seconds to perhaps one second or less.

The presence of motion detector 40 can serve a second useful purpose in that if the lock handle is rotated without proper "keying" of the lock function, an alarm 60 may be sounded for a timed period, thus warning occupants of an attempted entry.

It should be obvious to one skilled in the art that numerous modifications of the clutch mechanism as described, and numerous other applications for a clutch mechanism deriving a portion of its operating power from an input drive on selected command, will become apparent. I therefore do not want to be limited in the scope of my invention except as claimed.

We claim:

1. A low power drain clutch apparatus with power conservation for an electronic lock or the like comprising:

a solenoid engaged clutch mechanism activated by a logic device;

a detection means in proximity of said clutch mechanism for sensing completion of a lock function of a portion of said clutch mechanism; and wherein said solenoid is a latching solenoid to enable engagement of said clutch mechanism and said solenoid is immediately unlatched to disable engagement of said clutch mechanism in response to said detection means sensing completion of lock function as a power saving means.

2. A clutch apparatus according to claim 1 wherein:

said apparatus further comprises a timing means to unlatch said solenoid so as to disable engagement of said clutch mechanism in response to a determined time lapse without lock function.

3. A clutch mechanism, for an electronic lock or the like, comprising:

a first rotary clutch element, mounted for free rotation about, and relative to, a spindle, having a first jaw element;

a second clutch element, mounted for translation along, and rotation in common with, said spindle, having a second jaw element engageable with said first jaw element for effecting rotation of one of said clutch elements in response to the rotation of the other of said clutch elements;

means interposed between said clutch elements normally restraining said clutch elements in spaced-apart disposition;

means for resiliently urging one of said clutch elements to move towards the other of said clutch elements, in response to rotation of one of said clutch elements to cause said jaw elements to engage; and means for selectively preventing movement of said one clutch element towards said other clutch elements, whereby said first and second jaw elements are prevented from effecting engagement and rotation of said one clutch element in response to rotation of said other clutch element;

the improvement further comprising a latching means in said means for selectively preventing movement of said one clutch element;

timing means for release of said latching means; and motion sensing means for immediately releasing said latching means in response to selected lock function.

4. A clutch mechanism according to claim 3 wherein:

said latching means is a latching solenoid which is depowered after function to permit continued function of the lock without power draw.

5. A clutch mechanism according to claim 4 wherein:

said timing means applies power to unlatch said latching means after a predetermined time.

6. A clutch mechanism according to claim 4 wherein:

said motion sensing means applies power to unlatch said latching means upon sensing a selected motion associated with operation and opening of the lock.

7. A clutch mechanism according to claim 4 wherein:

said motion sensing means further senses unauthorized attempt to make the lock function by sensing motion of said first rotary clutch element and sounding an alarm.

8. A clutch mechanism according to claim 6 wherein:

said motion sensing means is an optical scanner.

* * * * *